Nov. 17, 1931.  H. A. HADLEY  1,832,550
SCALE
Filed Sept. 13, 1928    2 Sheets-Sheet 2
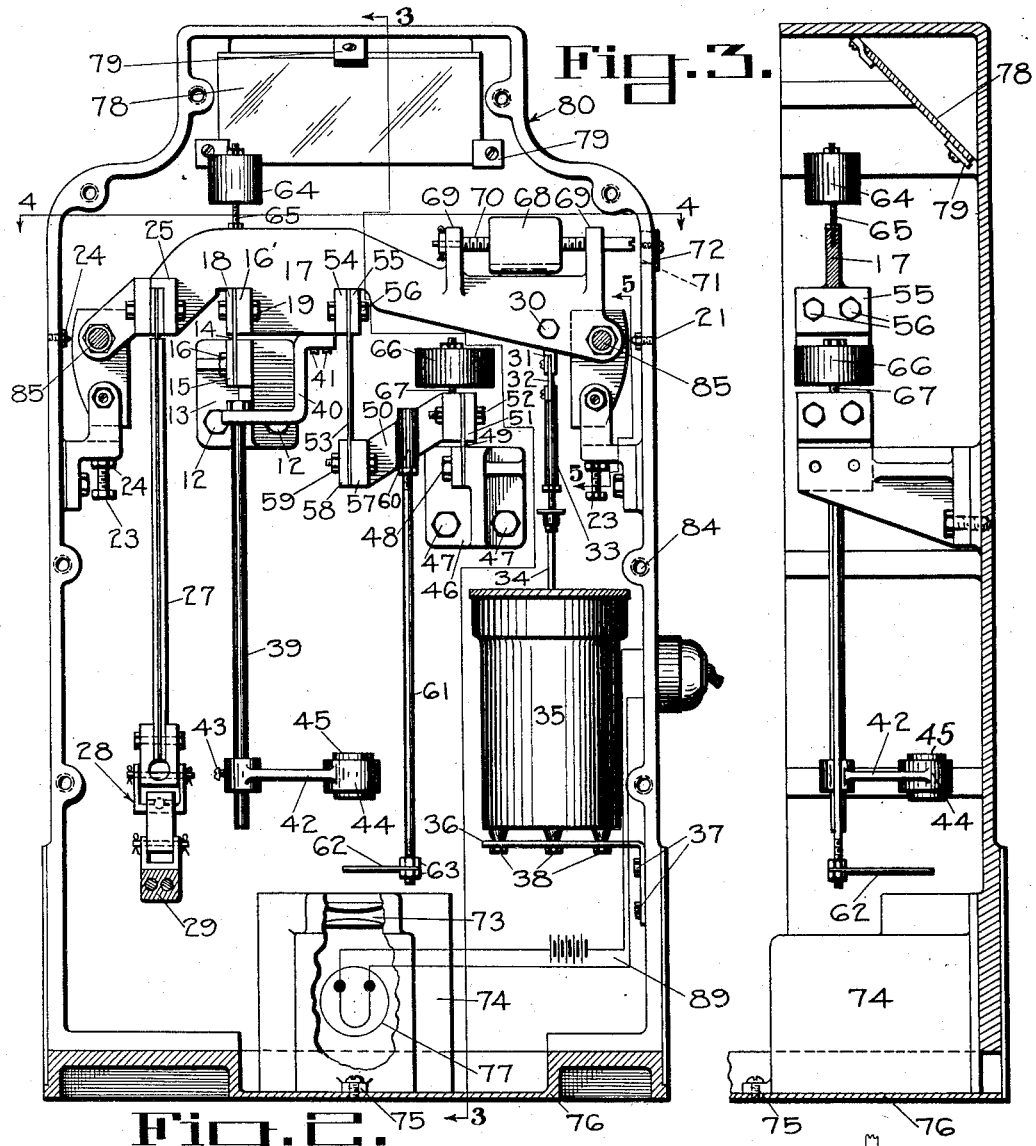
Fig.3.
Fig.2.
Fig.4.
Fig.5.
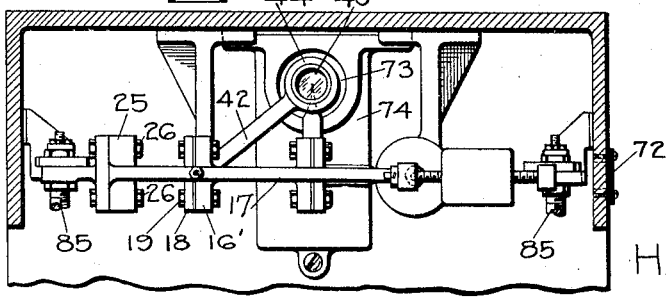
INVENTOR
HARLAN A. HADLEY
BY
ATTORNEY Patented Nov. 17, 1931

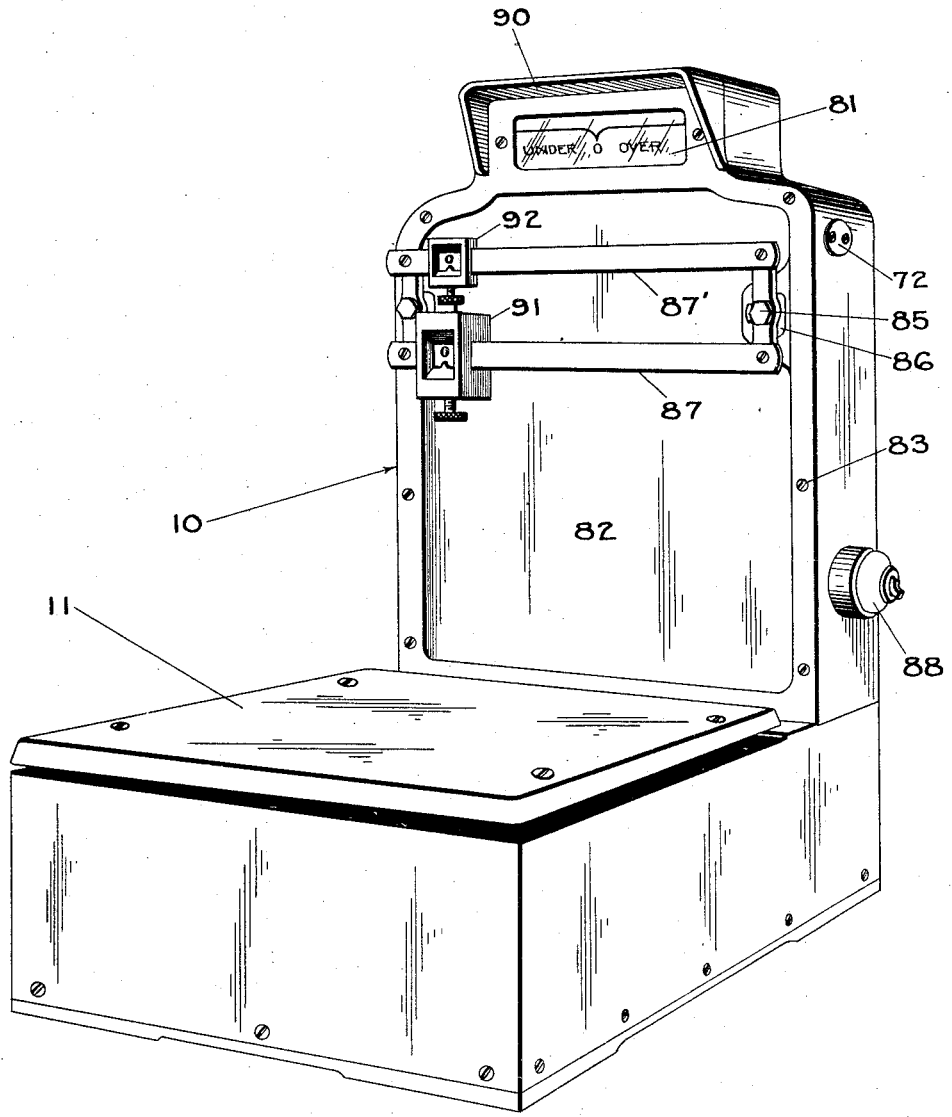

1,832,550

UNITED STATES PATENT OFFICE

HARLAN A. HADLEY, OF ST. JOHNSBURY, VERMONT, ASSIGNOR TO E. AND T. FAIRBANKS AND COMPANY, OF ST. JOHNSBURY, VERMONT, A CORPORATION OF VERMONT

SCALE

Application filed September 13, 1928. Serial No. 305,688.

This invention relates to improvements in weighing scales of that type in which the deflection of the beam is magnified and projected in enlarged form upon a suitable translucent chart by optical means. While devices of this type may be applied to scales for many different purposes, I have shown my invention applied to a predetermined weight, or precision, scale, it being understood that it is by no means limited to use with scales for accomplishing this result.

In direct-reading dial scales, either of the spring or pendulum type, it is in almost all cases necessary to multiply the deflection of the beam by means of a rack and pinion or similar means in order to amplify the indicator movement for the purpose of facilitating the weight readings. This arrangement induces friction into the scale mechanism which results in diminished sensibility. It is accordingly an important object of this invention to provide in a scale of the character described an improved indicating means in which friction is eliminated and the sensibility of the scale increased, the construction providing preferably a system of lenses which is adapted to throw the reflection of the indicator in enlarged form upon a suitable translucent chart.

Another important object of this invention relates to improvements in the means for mounting the indicating structure, the construction providing preferably a pair of pendulum rods, one carrying a pointer and the other a projecting lens, said pendulum rods being adapted to move equally and in opposite directions, thus providing a relative movement between the projecting lens and pointer which multiplies the movement of the scale beam for projection upon the translucent chart.

Still another object of this invention is to provide a flexible mounting for the pendulum rods comprising a flexible steel ribbon under compression.

Other objects of this invention, together with certain details of construction and combinations of parts, will be more particularly described by reference to the accompanying drawings and pointed out in the appended claims.

In the drawings:

Figure 1 is a perspective view of the scale embodying my invention;

Figure 2 is a front elevational view of the scale with the cover-plate, platform and lever system removed;

Figure 3 is a side elevation taken on line 3—3 in Figure 2;

Figure 4 is a cross-sectional view taken on line 4—4 in Figure 2; and

Figure 5 is a detail view, taken on line 5—5 in Figure 2, of the stop means for limiting the lateral movement of the scale beam.

Similar characters of reference designate corresponding parts throughout the several views.

Referring to the drawings wherein the preferred embodiment of my invention is set forth, there is shown a housing generally indicated by the reference character 10 in the horizontal portion of which is housed the scale levers and the means for suspending the platform 11. The lever and suspension systems form the subject-matter of the co-pending application of Alfred Bousfield, Serial No. 298,989, filed August 11, 1928.

Fixed to the rear wall of the scale housing by any suitable means, as screws 12, is a bracket 13 to which a length of flexible steel ribbon 14 is clamped by means of a clip 15 and screws 16. The ribbon 14 is attached to a machined cross-piece 16' integral with a beam 17 by means of a clip 18 and cap screws 19 and functions as a fulcrum for said beam. To the extremities of the beam are rigidly fastened stop plates 20 which cooperate with stops 21 to limit the endwise movement of the beam; with stops 22 to limit the lateral movement thereof; and with stops 23 to restrict the vertical travel of the beam. The stops are adjustable and are retained in adjusted position by means of lock nuts 24.

A laterally extending boss 25 is formed adjacent to one end of the beam 17 and to this boss is fixed by means of cap screws 26 the flexibly mounted steelyard rod 27 which carries at its lower extremity a self-aligning connection 28 connected to the tip of the extension, or long lever, 29 of the lever system. To the other end of the beam is fastened by any suitable means, as cap screws 30, an adjustable clevis 31 in the bifurcation of which is rigidly held a flexible steel strip 32 from which depends a rod 33 connected to the plunger 34 of a dash pot 35, the function of which is well understood in the art. The dash pot is seated upon a shelf 36 which is preferably fastened to the side wall of the scale housing by means of screws 37. Screws 38 are employed to retain the dash pot upon the shelf and are also adapted to adjust the plane of the base thereof.

A main pendulum rod 39 is attached to the beam through the medium of an offset bracket member 40 which is fastened to the beam by means of screws 41. A bracket 42 is mounted on the pendulum rod 39 and is vertically adjustable thereon. A set screw 43 is adapted to retain the bracket 42 in adjusted position along the length of the rod. At the free end of the bracket 42 is formed an integral annular member 44 in which is mounted a projecting lens 45.

To a second bracket 46 attached to the rear wall of the housing by means of screws 47 is clamped by any suitable means, as screws 48, a flexible steel plate 49 which acts as a fulcrum for an auxiliary pendulum lever 50 which is rigidly fixed to said fulcrum plate by a clip 51 and cap screws 52. The lever 50 is connected to the beam, or main lever 17 through a flexible steel ribbon 53, which is clamped at its upper end to a lateral boss 54 on the main lever by a clip 55 and cap screws 56 and at its lower extremity to a boss 57 on the auxiliary pendulum lever by a clip 58 and cap screws 59.

The auxiliary pendulum lever has an enlarged portion 60 substantially centrally thereof in which is formed a vertical aperture, the aperture being screw-threaded to receive the threaded upper extremity of an auxiliary pendulum rod 61 which carries at its lower extremity a vertically adjustable pointer 62, the pointer being retained in adjusted position by lock nuts 63.

In order to distribute the weight suitably about the pivot lines, a balance weight 64 is adjustably mounted on a screw-threaded stem 65 fixed to the main lever and an auxiliary balance weight 66 is mounted for adjustment on a threaded stem 67 fixed to the pendulum lever 50. A balance weight 68 is adjustably mounted in apertured projections 69 formed integral with main lever 17. The function of the balance weight 68 is to balance the scale at its zero point and it is mounted on a screw-threaded stem 70, which is accessible through an opening 71 normally closed by a cover-plate 72.

The indicator 62 when in normal position, as shown in Figure 2, is arranged to be placed in the optical axis with a condensing lens 73 placed in the upper wall of a housing 74 which is attached, as at 75, to the base 76 of the scale. The projecting lens 45 is arranged above the indicator. A source of light 77 which is preferably an electric light is arranged underneath the condensing lens and is contained in the housing 74.

A reflecting member 78 is suitably fixed by means of clips 79 in an extension 80 integral with the scale housing and is arranged in the path of the image of the indicator at a suitable distance and angle from lens 45 to deflect the image substantially at right angles onto a chart 81 made of any suitable translucent material. The chart is mounted in any convenient manner in a cover-plate 82 fastened to the vertical portion of the scale housing by means of screws 83 entering screw-threaded apertures 84 in the walls of the housing.

Studs 85 carried by the main lever 17 extend through apertures 86 in the cover-plate and have fixed to their free extremities a capacity beam 87 and a tare beam 87′.

Located on a side wall of the housing is a switch 88 in the line 89 which leads to the light 77. In order to increase the visibility of the reflection of the indicator on the screen 81, a visor 90 is placed above the chart, said visor being formed integral with the cover-plate.

It will be understood that the scale may be placed upon an out-of-level support without affecting its accuracy since the lens bracket acts as a main pendulum arm and the pointer as an auxiliary pendulum arm for the purpose of plumbing themselves to compensate for any out-of-level conditions.

In operation, the operator sets the poises 91 and 92 at predetermined positions on the beams 87 and 87′ which causes the right end of the beam 17 to move downwardly until it comes to rest on stop 23. The movement of the beam 17 causes the pendulum rods carrying the projecting lens 45 and pointer 62 to move apart and the projected image of the pointer 62 moves toward the left, or "under", area of the screen. The material to be weighed is now placed upon the platform and the operator adds to the load if the image is in the "under" area of the chart or removes a portion of load when the image is in the "over" area of the chart. When the image of the pointer is at the zero mark, it indicates that the scale beam is in equilibrium and the predetermined weight has been attained.

Having thus described my invention, what I claim as new and desire to secure by Letters Patent of the United States is:

1. In a scale of the character described, the combination with a scale lever, of pendulated means secured thereto, and indicating means comprising a pointer and a projecting lens mounted on said pendulated means and movable therewith and adapted to move relative to each other.

2. In a scale of the character described, the combination with a scale lever, of pendulated means secured thereto, and indicating means comprising a pointer and a projecting lens connected to the said pendulated means and movable therewith and adapted to move relative to each other.

3. In a scale of the character described the combination with a scale lever, of pendulated means secured thereto, and indicating means comprising a pointer and a projecting lens fixed to the said pendulated means and movable therewith and adapted to move relative to each other.

4. In a scale of the character described, in combination, a lever, pendulum rods movable therewith, indicating means carried by said rods, and a translucent chart adapted to cooperate with said indicating means for producing a weight indication.

5. In a scale of the character described, in combination, a lever, pendulum rods movable therewith, indicating means carried by said rods, said means comprising a pointer and a projecting lens, and a translucent chart adapted to receive the projection of said pointer.

6. In a scale of the character described, in combination, a lever, pendulum rods movable therewith, indicating means adjustably carried by said pendulum rods, said means comprising a pointer and a projecting lens, and a translucent chart adapted to receive the projection of said pointer.

7. In a scale of the character described, in combination, a plurality of levers, pendulum rods carried thereby, indicating means mounted on said rods, said means comprising a pointer and a projection lens, and a translucent chart adapted to receive the projection of said pointer.

8. In a scale of the character described, in combination, a lever, a pendulum rod carried thereby, a projecting lens mounted on said pendulum rod, a second lever, an auxiliary pendulum rod carried by said second lever, a pointer mounted on said auxiliary pendulum rod, and a translucent chart adapted to receive the projection of said pointer.

9. In a scale of the character described, in combination, a lever, a pendulum rod movable therewith, a projecting lens mounted on said rod, a second lever, an auxiliary pendulum rod movable therewith, a pointer mounted on said auxiliary pendulum rod, means for connecting said levers, and a translucent chart adapted to receive the projection of said pointer.

10. In a scale of the character described, in combination, a plurality of levers, a flexible steel ribbon connecting said levers, a pointer adjustably carried by one of said levers, a translucent chart, and movable projecting means for projecting said pointer upon said screen, said projecting means being operatively connected to said levers.

11. In a scale of the character described, in combination, a housing, brackets fixed to said housing, steel plates attached to said brackets, levers fulcrumed on said plates, a pointer, a translucent chart, and means movable with one of said levers for projecting said pointer upon said screen.

12. In a scale of the class described, in combination, a housing, brackets fixed to said housing, steel plates attached to said brackets, levers fulcrumed on said plates, a pointer mounted on one of said levers, a translucent chart, and a projecting means mounted on another of said levers for projecting said pointer upon said screen.

13. In a scale of the character described, in combination, a lever, pendulum rods movable therewith, one rod carrying a pointer and the other rod a projecting lens, the said rods being so disposed as to move equally and in opposite directions.

14. In a scale of the character described, in combination, a main lever, a pendulum rod movable therewith, a projecting lens mounted on said rod, an auxiliary lever, an auxiliary pendulum rod movable therewith, a pointer mounted on said auxiliary pendulum rod, and means for causing the said projecting lens and pointer to move equally and in opposite directions.

15. In a scale of the character described, in combination, a main lever, a pendulum rod movable therewith, a projecting lens mounted on said rod, a resiliently fulcrumed auxiliary lever, an auxiliary pendulum rod movable therewith, a pointer mounted on said auxiliary pendulum rod, and means for causing the said projecting lens and pointer to move equally and in opposite directions.

16. In a scale of the character described, in combination, a pair of levers, resilient means connecting the said levers, a pendulum rod connected to each lever and movable with the said lever, one rod carrying a pointer and the other rod a projecting lens, and flexible means connecting the said levers adapted to cause the said pointer to move equally with the said projecting lens but in an opposite direction thereto, whereby a projected indication is registered on a co-operating translucent chart.

HARLAN A. HADLEY.